United States Patent [19]
Ueberwolf et al.

[11] 4,054,437
[45] Oct. 18, 1977

[54] METHOD AND APPARATUS FOR CURVING SHEETS OF GLASS AND THE LIKE

[75] Inventors: Heinz Ueberwolf, Herzogenrath; Hans-Pieter Siemonsen, Aachen, both of Germany

[73] Assignee: Saint-Gobain Industries, Neuilly-sur-Seine, France

[21] Appl. No.: 690,037

[22] Filed: May 25, 1976

[30] Foreign Application Priority Data

Mar. 5, 1976  France ............................... 76.06266

[51] Int. Cl.² ............................................. C03B 23/02
[52] U.S. Cl. ..................................... 65/107; 65/104; 65/273; 65/285
[58] Field of Search ................ 65/104, 107, 273, 275, 65/285

[56] References Cited
U.S. PATENT DOCUMENTS 3,223,501  12/1965  Fredley et al. ............... 65/182 A X
3,545,951  12/1970  Nedelec ................................. 65/104
3,801,298  4/1974  Bezombes .............................. 65/104

Primary Examiner—Arthur D. Kellogg
Attorney, Agent, or Firm—Pennie & Edmonds

[57] ABSTRACT

The sheet to be curved, such as glass at a softening temperature, is advanced on a fixed curved bed formed by a series of curved rods having different angles of inclination to form an ascending convex bed with an increasing curvature profile. The sheet is thus gradually raised and simultaneously curved by sagging of the edges. The curved rods have aligned end sections mounted in the same horizontal plane and the inclinations progressively increase. The bed is followed by a bed of constant curvature profile formed by curved rods having the same inclination. Means are provided for independently adjusting the inclination of each rod. Particular ranges of spacing and rate of advance are given.

10 Claims, 4 Drawing Figures

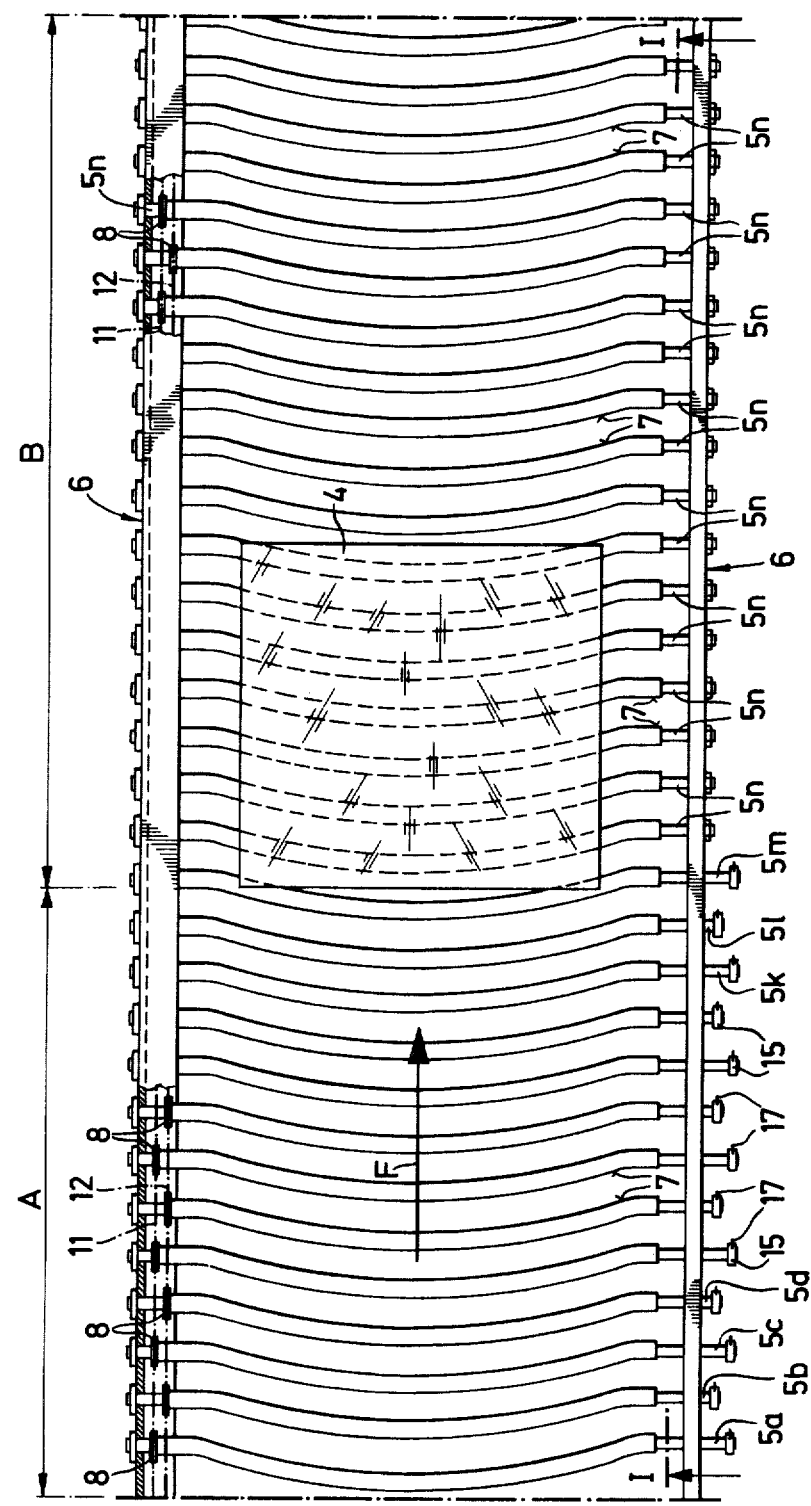

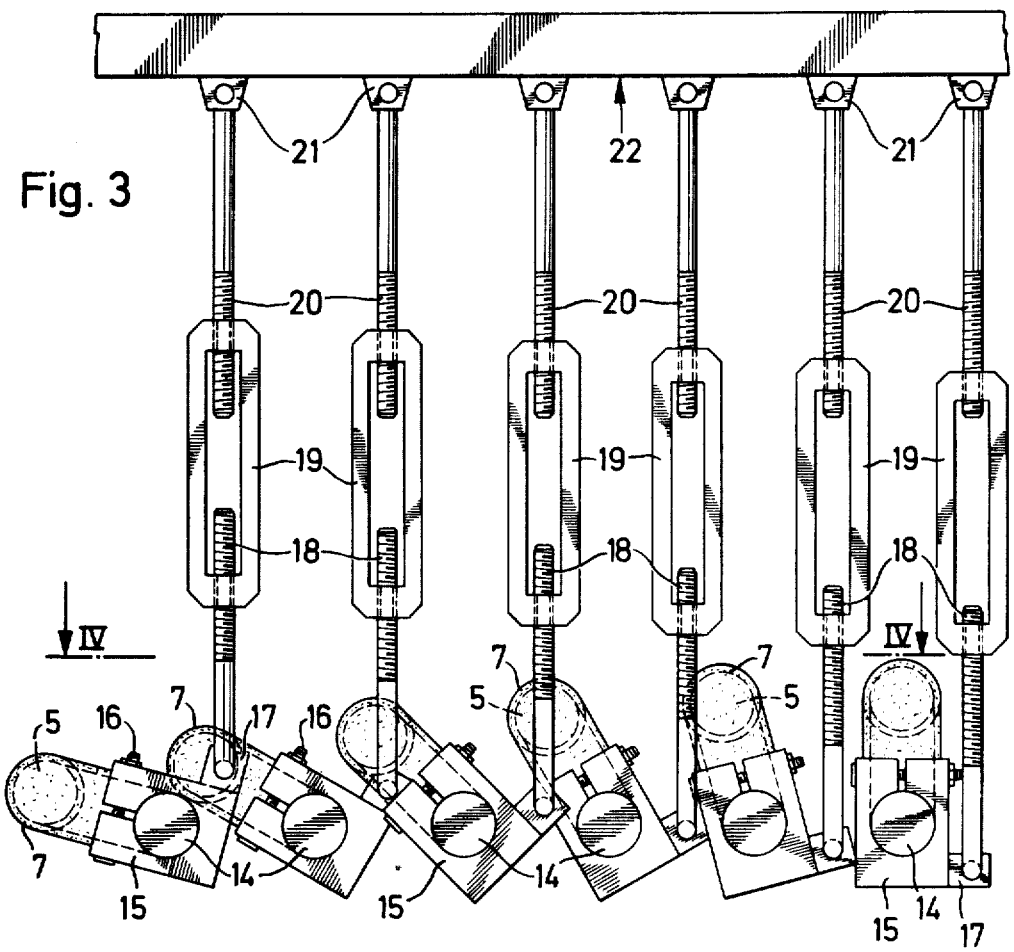
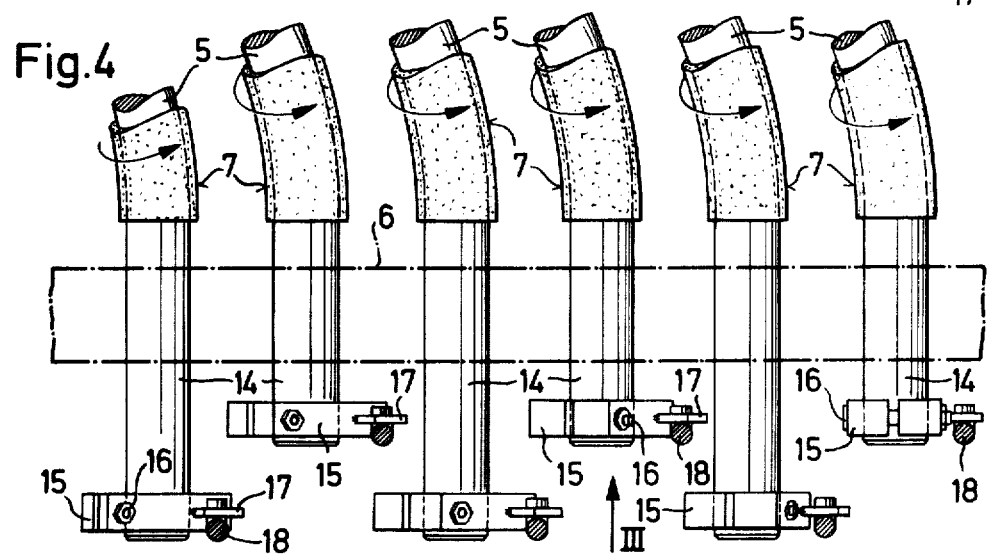

METHOD AND APPARATUS FOR CURVING SHEETS OF GLASS AND THE LIKE

The present invention relates to the bending or curving of sheets of material in the plastic state such as sheets of glass brought to softening temperature.

It is known from U.S. Pat. No. 3,545,951 to use as a bending or curving form a series of curved rods capable of pivoting about respective axes passing through their two ends and situated in the same horizontal plane. Each of these rods is rigidly connected to a crank arm and the various arms are connected to a common control bar. The rods thus form a bed which is increasingly curved as the rods are raised higher by means of the control bar. In addition, each rod is enclosed in a sleeve which is flexible to allow bending but possesses torsional strength and which is rotationally driven, thus causing the sheets of glass to be advanced. As the tangential velocity of these sleeves is identical at all points, no disturbing sliding or sticking problems occur during displacement of the sheets.

The curving or bending operation is carried out in the following manner. The curved rods are initially oriented in the horizontal plane of their pivoting axes, and receive the sheet which is advanced in this plane by a conveyor. Then the control bar is displaced in a translational movement and, by means of cranks, simultaneously pivots the curved rods so as to bring them into an inclined position with respect to the plane of advancement which corresponds to the desired curvature to be imparted to the sheet of glass, this position being maintained by the action of a jack.

When the bed is no longer flat, the sheet of glass at a softening temperature sags under its own weight or under the pressure of a regulatable counterform, and adopts the new shape provided by the rods. It is thus possible to obtain sheets having a desired degree of curvature, the maximum curvature being obtained when all the rods are turned to a right angle with respect to their original horizontal orientation. The sheet of glass is then advanced to a cooling unit where it sets, cooling possibly being carried out rapidly so that the glass is simultaneously subjected to a thermal tempering step.

As soon as the sheet of glass has left the curving zone of the installation, the curved rods are returned to the plane of advancement of the conveyor so that the operating cycle can be repeated on a fresh sheet of glass.

When a counterform is used, it is movable in translation and its displacement is synchronized with the rotation of the sleeves. As a result, it is still possible for the curving operation to be effected without interrupting the advancement of the sheets. The use of a counterform makes it possible to operate at a lower temperature and thus obtain a higher quality product without reducing the rate of manufacture. However, the apparatus is fairly complicated and requires accurate regulation.

Whatever the mode of operation employed, one of the important advantages is that a single apparatus can be used to provide sheets of glass with different degrees of curvature simply by varying the degree of inclination of the curved rods with respect to the horizontal plane of advancement.

A principal object of the present invention is to simplify the above described curving process and apparatus, while retaining the advantages thereof.

In accordance with the invention, in the curving zone the sheets to be curved advance on a series of curved rods adjusted at fixed angles of inclination, the said angles increasing from one rod to the next from zero inclination (which corresponds to the position of the rod in the horizontal plane of advancement) to a given maximum inclination corresponding to the final degree of curvature to be imparted to the sheets. The curved rods form an ascending convex bed with an increasing curvature profile. Thus a sheet, during its continued advancement on the curved rods is gradually raised and simultaneously curved. By virtue of this mode of operation, it is not necessary to provide mechanical control means for constantly pivoting the curved rods away from the plane of advancement and for returning them to this plane. On the contrary, for a given line of curvature to be imparted to the sheet such as glass, the inclination of each curved rod in a group of successive rods is selected once and for all and is normally not modified during the entire period that the device is used to produce a particular product line.

Preferably the curved rods are inclined in the opposite direction to the direction of advancement of the sheets.

The difference in the angle of inclination from one rod to the next is advantageously regulated in such a way that the level difference between the peaks or the highest points of two successive curved rods ranges from 0-10 mm and preferably from 4-7 mm.

According to an advantageous mode of implementing the process, the sheets of glass are advanced into the curving zone at a rate of 6-18 meters per minute on a group of 5-15 curved rods which are inclined with respect to the horizontal at an angle which increases from one rod to the next and with spacing of 6-16 cm between two successive rods. The rate of advancement of the glass depends on the thickness of the sheets to be curved. The rate of advancement, may be high in the case of thin sheets and lower as the thickness increases. To provide some idea of the values involved, the rate of advancement advantageously varies from 6-18 meters per minute when the thickness of the glass varies from 8-3 mm. For example, in the case of sheets having a thickness of 4 mm, good results are obtained with advancement rates of 12-14 meters per minute.

After passing through the curving zone per se, the sheets of glass are advanced on a group of curved rods which are all inclined at the same angle which corresponds to the line of curvature of the last rod in the curving zone per se, i.e., corresponding to the final degree of curvature to be imparted to the sheets of glass. It is thus possible to accomplish, if need, the curvature and to obtain stabilization of the shape imparted to the sheets of glass.

In the apparatus, the curved rods have aligned end sections forming axes of rotation, and the axes are mounted in the same horizontal plane. Means are provided for independently adjusting the inclination of each rod.

Other objects, features and advantages of the method and the apparatus for implementing the same will be made apparent in the following detailed description of a preferred embodiment thereof, with reference to the accompanying drawings in which FIG. 1 is a diagrammatic, longitudinal sectional view through a curving apparatus, taken along the line I—I of FIG. 2;

FIG. 2 is a plan view of the conveyor device in the curving zone;

FIG. 3 is an elevational view of the means for regulating the angles of inclination of the curved rods; and FIG. 4 is a partial, plan view of FIG. 3 representing the ends of the pivoting shafts of the curved rods.

Figure 1:
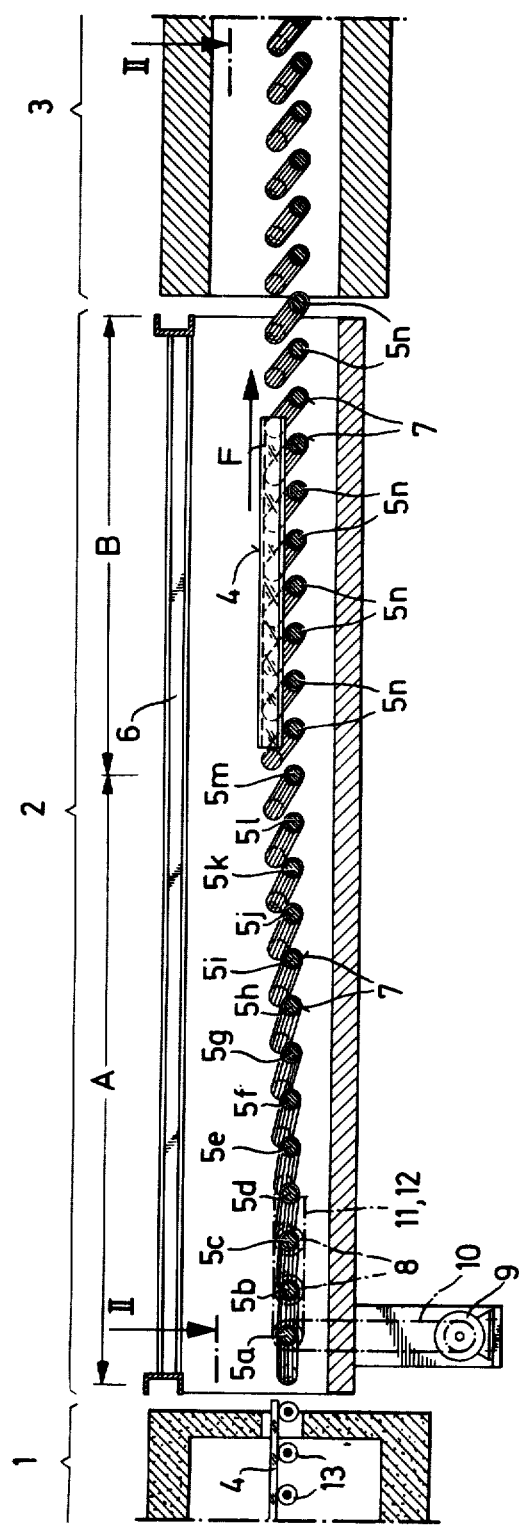

Referring to FIG. 1, a heating oven 1 is shown in which the sheets of glass 4 are heated to the softening temperature. A curving zone 2 is disposed downstream of the oven in which the sheets of glass are provided with the desired degree of curvature. The curved sheets are cooled in zone 3, this cooling operation possibly being carried out rapidly by means of air jets to simultaneously subject the sheets of glass to a thermal tempering step. The sheets are advanced through the installation in a horizontal position.

The initially flat sheets are advanced in the heating oven by cylindrical rollers 13 which are driven in rotation. Thereafter, the conveying rollers comprise curved rods 5 pivotably mounted at their two aligned ends in the frame 6 (FIG. 2). These curved rods are enclosed in flexible tubular sleeves 7 possessing torsional strength. The sleeves are driven by means of a motor 9 through the intermediary of chains 10, 11, 12 and toothed pinions 8 meshing with the chains and affixed to the ends of the sleeves.

The axes of the curved rods are preferably spaced apart by approximately 6–15 cm. The tubular sleeves 7 may have a diameter of 40–60 mm.

All the rods 5 have the same height, for example 120 mm. They are oriented in the upstream direction and inclined with respect to the horizontal. Their angles of inclination in the curving zone are adjusted so that the angles increase from one rod to the next from the lefthand side to the righthand side of the figure. The first rod 5a, for example, is maintained in the plane of advancement, i.e. its point of contact is situated in the plane of the lower face of the flat sheet of glass 4 issuing from the oven 1. The following rod 5b is adjusted at an angle of inclination such that the position of its high point (in the axis of the oven) is located between 0 and 10 mm and preferably between 4 and 7 mm above the corresponding point on the rod 5a. The rod 5c is adjusted at a slightly higher angle of inclination and thus projects, in its median region, above the level of the preceding rod by about 4–7 mm. The same applies to the succeeding rods 5b–5m which are each slightly more inclined with respect to the horizontal than the preceding rod. In this curving zone the spacing of the curved rods is advantageously in the range of 6–16 cm.

After passing over the first curved rod 5a, the sheet of glass 4 issuing from the oven 1 in the direction of the arrow F passes over the second rod 5b and is thus slightly raised, mainly in its median region, and to a lesser extent in its lateral regions. The leading edge of the sheet of glass is thus moved downstream and is gradually raised to the height corresponding to the inclination of the curved rods situated at the other end of the curving zone, this height depending on the final line of curvature to be imparted to the sheets of glass.

The number of curved rods whose angles of inclination are so adjusted can amount to 5–15 and depends on the degree of curvature. For example, good results are obtained when, for a radius of curvature of 1000–1500 mm. the curving zone per se, as shown in the drawings, comprises twelve curved rods 5b–5m whose angle of inclination increases from one rod to the next. In the case of a desired radius of curvature of 2000 mm. good results were obtained from the point of view of the optical qualities of the curved glass using only eight differently inclined curved rods.

The rate of advancement at which the sheets of glass are displaced on the rods may be increased as the thickness of the sheets decreases. To give some idea of the values involved, the rate of advancement advantageously varies from 6–18 meters per minute when the thickness of the sheets decreases from 8–3 mm. In the case of sheets having a thickness of 4 mm, good results are obtained, for example, with advancement rates of 12–14 meters per minute.

The temperature of the sheets of glass in the curving zone may be on the order of 620° C.

At the end of the curving zone A (rods 5a–5m) per se, i.e., the zone in which the curved rods possess an increasing angle of inclination from one rod to the next, there is provided a series of curved rods 5n which all possess the same angle of inclination corresponding to the angle of inclination of the last rod 5m in the curving zone A. The number of these rods 5n whose inclination corresponds to the desired final line of curvature may range from 5–15.

Zone B, (rods 5n) in which the curved rods all possess the same angle of inclination, is used to stablize the curve imparted to the sheets of glass. In this region the sheets of glass conform more completely, during their advancement movement, to the line of curvature of the bed formed by the curved rods. In this region the curved rods possess mutual spacing of 6–16 cm. and the sheets of glass are displaced at a rate which preferably corresponds to the rate of advancement in the curving zone per se.

FIGS. 3 and 4 show the elements used to adjust the angles of inclination of the curved rods. For reasons of clarity, the difference in the angle of inclination from one rod to the next has been exaggerated. Each curved rod 5 is equipped at one end with a clamping means 15 which is firmly tightened on the end of the rod by the screw 16. Each clamping means 15 includes an apertured lug 17 in whose orifice is coupled the bent end of the threaded bolt 18. Together with the threaded link 19 and the bolt 20 connected to the frame, bolt 18 forms a turnbuckle by means of which the distance between the two bolts 18 and 20 may be varied in the known manner by simply rotating the link 19. The bolt 20 is pivoted to the beam 22 of the curving apparatus by means of lug 21.

To save space, in view of the proximity of the pivoting shafts of the successive curved rods, the clamping means 15 are alternately staggered along these shafts, as shown in FIG. 4.

We claim

1. A process for bending to a predetermined curvature a sheet of material in the plastic state, such as a sheet of glass brought to the softening temperature, on a curved bed formed by a series of curved rods mounted for pivoting about axes disposed in the same horizontal plane, which comprises inclining the curved rods at different angles of inclination with respect to said horizontal plane to form an ascending convex bed with a curvature profile which increases progressively to a curvature corresponding to the predetermined curvature which is to be imparted to the sheet, maintaining the rods at said angles of inclination to form a fixed bed having said increasing curvature profile and advancing the sheet on said fixed bed in the direction of increasing curvature thereof by a rotationally driven sleeve disposed about at least one of the curved rods.

2. A process according to claim 1 in which said curved rods have the same curvature with similar aligned end sections mounted in said horizontal plane and said angles of inclination thereof progressively increase in the direction of advancement of the sheet.

3. A process according to claim 2 in which the sheet is advanced beyond said curved bed on a bed having a constant curvature profile corresponding to the predetermined curvature to be imparted to said sheet which is formed by a series of similarly curved rods having the same angle of inclination.

4. A process according to claim 1 in which the difference in height of the peaks of successive curved rods is in the range of 4–7 millimeters.

5. A process according to claim 1 in which said bed has 5–15 curved rods spaced apart by 6–16 centimeters and the sheet of glass is advanced thereon at the rate of 6–18 meters per minute.

6. A process according to claim 1 in which the product of the thickness of said sheet times its rate of advancement is of the order of 0.05 square meters per minute.

7. Apparatus for bending to a predetermined curvature a sheet of material in the plastic state, such as a sheet of glass brought to softening temperature, which comprises a series of curved rods forming a curved bed for receiving said sheet, said rods having aligned end sections forming respective axes of rotation, means for pivotally mounting said curved rods with the axes of rotation thereof in the same horizontal plane, a rotationally driven sleeve disposed about at least one of said rods for advancing a sheet along said bed, and means for holding said rods at different angles of inclination to form a fixed ascending convex bed having a curvature profile which increases progressively in the direction of advancement of the sheet to a curvature corresponding to said predetermined curvature.

8. Apparatus according to claim 7 in which said curved rods have the same curvature and said angles of inclination progressively increase in said direction of advancement.

9. Apparatus according to claim 7 including a further series of curved rods positioned downstream of said series of rods and having aligned end sections forming respective axes of rotation, the axes of rotation of said further series being in the same horizontal plane as the axes of the first-mentioned series, said further series of rods being held at the same angle of inclination to provide a bed having a constant curvature profile corresponding to said predetermined curvature.

10. Apparatus according to claim 7 including independent means for adjusting the angle of inclination of each curved rod.

* * * * *